United States Patent [19]
Bollmann

[11] Patent Number: 5,016,487
[45] Date of Patent: May 21, 1991

[54] BALL BEARING GEARS
[75] Inventor: Dieter Bollmann, Reinheim, Fed. Rep. of Germany
[73] Assignee: Bollmann Hydraulik GmbH, Fed. Rep. of Germany
[21] Appl. No.: 204,725
[22] Filed: Jun. 10, 1988
[30] Foreign Application Priority Data
Nov. 19, 1987 [DE] Fed. Rep. of Germany ....... 3739204
Jan. 23, 1988 [DE] Fed. Rep. of Germany ....... 3801930
[51] Int. Cl.⁵ .................. F16H 13/04; F16H 15/40
[52] U.S. Cl. ..................................... 74/206; 74/216.3
[58] Field of Search ............. 74/202, 206, 216, 216.3, 74/798

[56] References Cited
U.S. PATENT DOCUMENTS

| | | | |
|---|---|---|---|
| 2,764,030 | 9/1956 | Mackta | 74/216.3 |
| 4,069,718 | 1/1978 | F'Geppert | 74/206 |
| 4,829,851 | 5/1989 | Imase | 74/798 |

FOREIGN PATENT DOCUMENTS

| | | | |
|---|---|---|---|
| 60-146954 | 8/1985 | Japan. | |
| 60-179563 | 9/1985 | Japan. | |
| 1019148 | 5/1983 | U.S.S.R. | 74/798 |
| 1240980 | 6/1986 | U.S.S.R. | 74/798 |
| 1368545 | 1/1988 | U.S.S.R. | 74/798 |

OTHER PUBLICATIONS
Hogg et al.; "Reverse Drive Train"; *IBM Technical Disclosure Bulletin*; vol. 14, No. 3, p. 779; Aug. 1971.

Primary Examiner—Leslie A. Braun
Assistant Examiner—Scott Anchell
Attorney, Agent, or Firm—Fulbright & Jaworski

[57] ABSTRACT

Gears with a flat drive part provided with a circular guide groove eccentric to the axis of rotation. A flat driven part provided with an endless guide groove centered on the axis of rotation on a face toward the drive part, for guidance of balls transmitting force arranged in radial guide slots in a flange fixed to an outer casing between the driven and drive part. The radial guides hole cover the eccentric deflection of the drive part ball guide groove whereby the balls are secured against rotation around the axis of rotation of the gear. In multiple gears, driven disks corresponding to the number of speeds are provided. A hollow shaft protrudes through the driven disks and contains ball pans to receive balls that may be moved into the associated driven part. A cam slide with cam beads is guided in the hollow shaft. Axial displacement of the cam slide always establishes a rotationally fixed connection between a driven disk and the hollow shaft.

20 Claims, 13 Drawing Sheets

BALL BEARIG GEARS

BACKGROUND OF THE INVENTION

There has been nothing comparable to the present invention since the invention of the toothed gear, which is likely to be replaced in wide technical fields by the gears according to the invention.

SUMMARY OF THE INVENTION

An object of the invention is to produce gears with a greater transmission range, reduction range, and load range than with conventional toothed gears including conventional harmonic drive gears and cyclo gears.

This object is attained by gears with a driving part and a driven part, rotatably located in a housing. The driving part is provided with a circumferential groove and the driven part with a similarly endless groove extending at an angle to the groove of the driven part. Balls are used to effect the transfer of the force and are guided in a sliding manner in a radial direction such that they impart to the driven disk a rotation different from the angle of rotation of the drive part. An essential advantage of the invention is that forces are transmitted exclusively by balls, i.e. with rolling friction only, and thus with high efficiency and practically no loss. The gears may be produced with any transmission and reduction ratio desired. Reductions which cannot be attained by conventional reduction gears of less than 9:1 may be obtained. It is also expected that manufacture of gears with a broken reduction ratio will be possible. The manufacturing effort is low compared with the effort required for production of toothed gears.

Embodiments and advantages will be apparent from the description explained with reference to the attached drawing.

DETAILED DESCRIPTION OF THE PREFERRED EMBODIMENT

Figure 2:
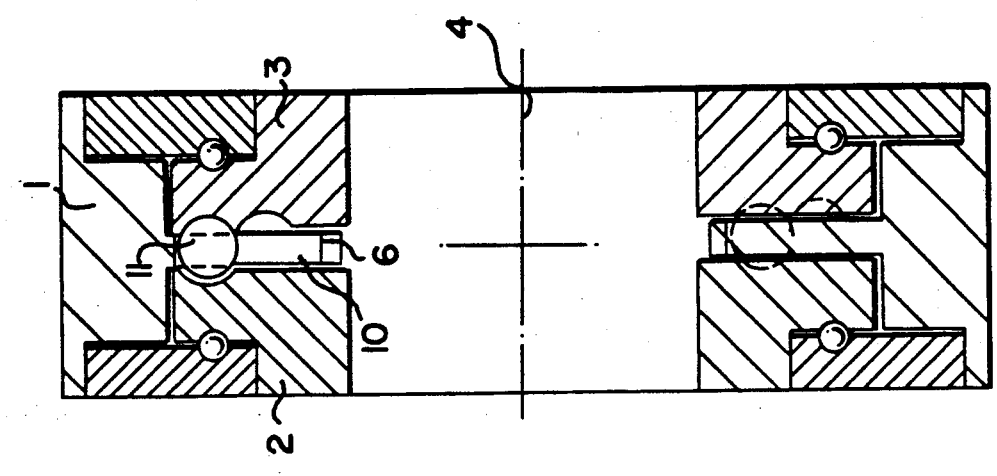
FIG. 2 shows a section on II—II through FIG. 1.
Figure 1:
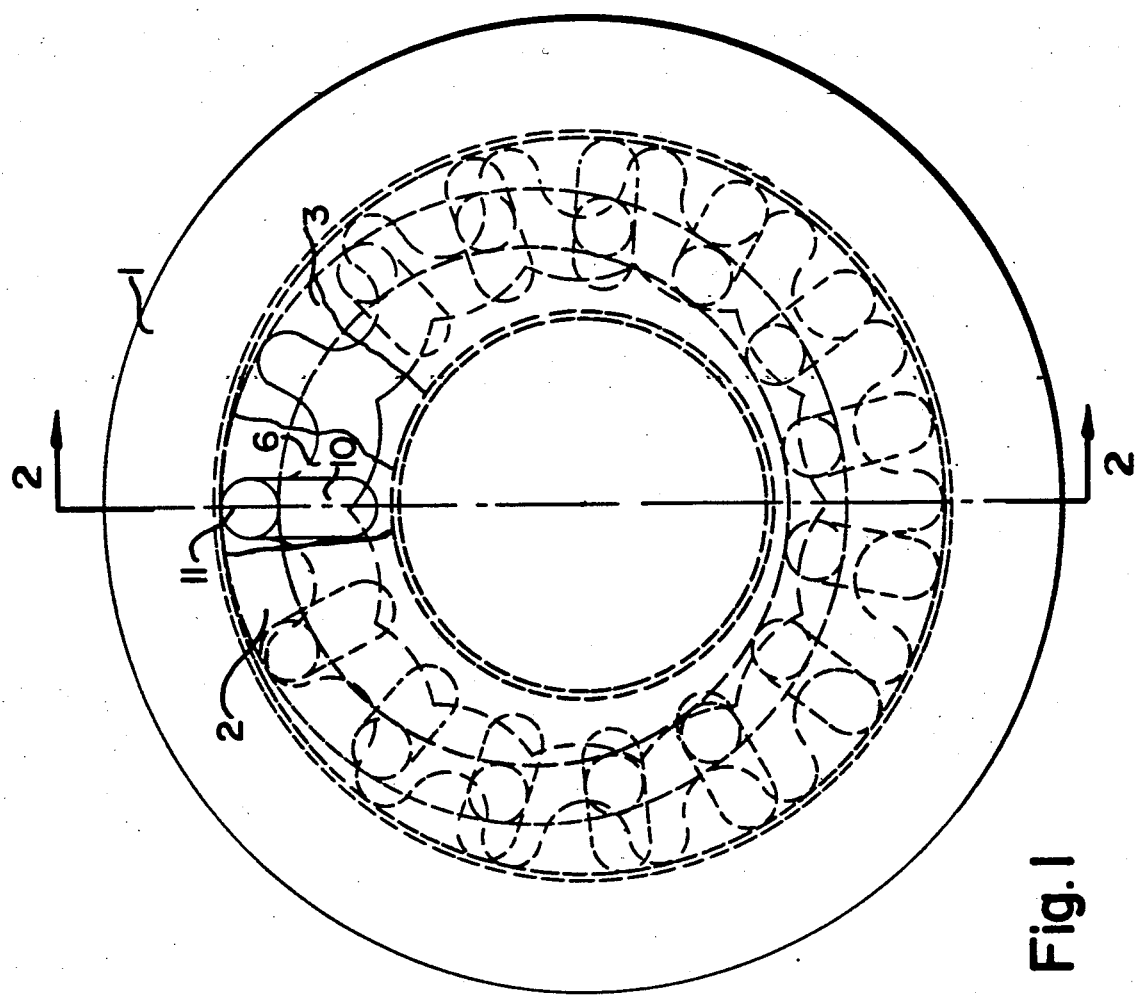
FIG. 1 shows a schematic view of the gears according to the invention.

FIGS. 1, 6, 11 and 14 show different embodiments of gears with drive and driven axles 4 with a casing 1 see in particular FIG. 1 and 2. The drive and driven parts are essentially annular disks 2 and 3 respectively. The drive disk 2 displays a circular guide groove 9 extending eccentrically relative to the rotating axle. The driven disk 3 displays an endless guide groove 14 on a surface facing the drive disk. The groove 14 exhibits curve segments centered on the rotating axle, to guide the balls 11 (FIG. 1 and 2) and transmit the force. A flange 6 is fixed to the casing and positioned between the drive disk 2 and the driven disk 3. The flange displays a fundamentally arbitrary number of radial longitudinal hole guides 10 covering the eccentric deflection of the ball guide groove 9 of the drive disk 2. The radial hole guides 10 secure the balls 11 against rotation around the center axis of the gear.

Figure 4:
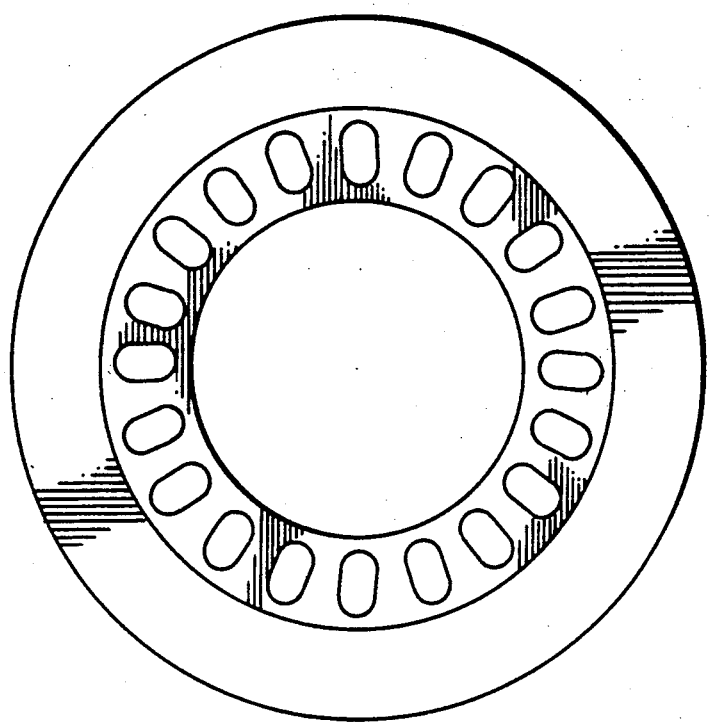
FIG. 4 shows a view of the flange of the gear fixedly mounted on a casing.
Figure 3:
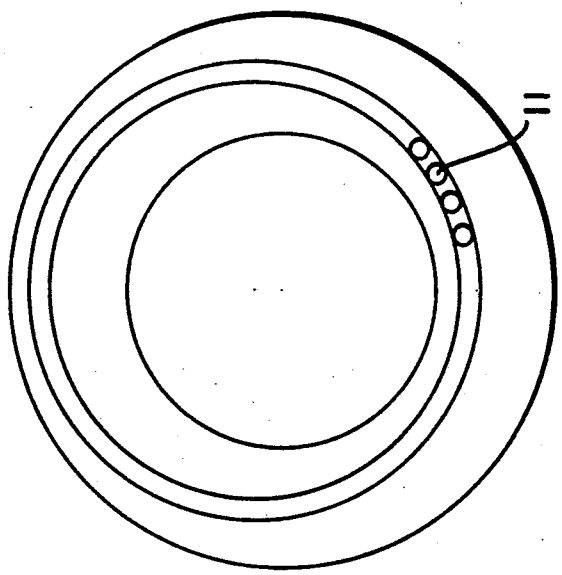
FIG. 3 shows a view of the front of the drive part of the gear.
Figure 5A:
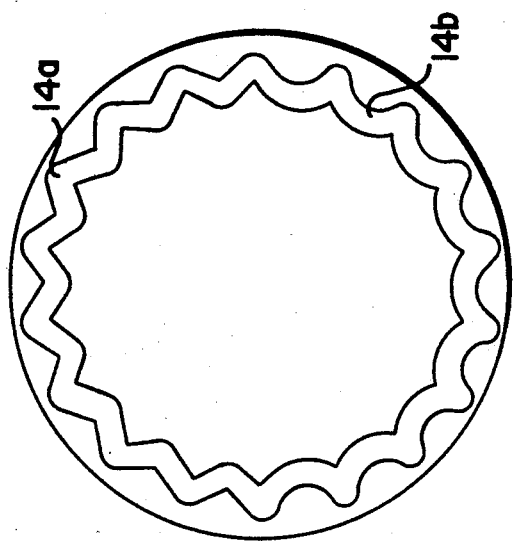
FIGS. 5A-D shows four views of partially cut driven parts with different embodiments of the ball guide grooves.
Figure 5B:
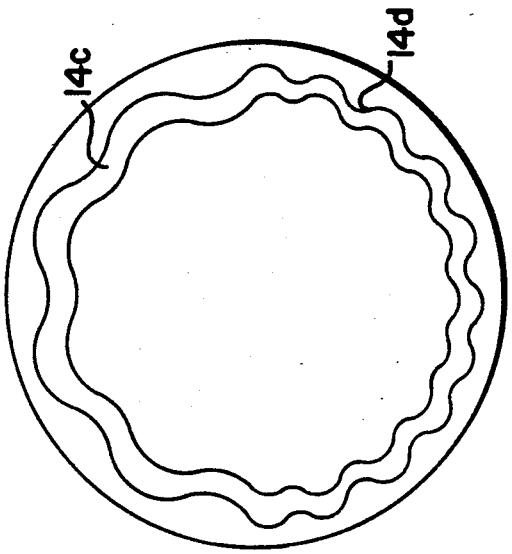
Figure 5C:
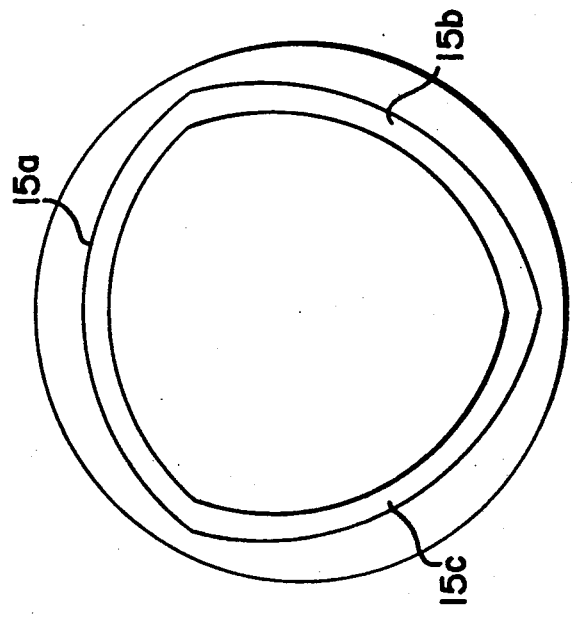

In the gear shown forces are transmitted by the balls 11 exclusively with rolling friction. The transmission is therefore nearly free of losses. Due to the eccentric arrangement of the ball guide groove 9 the individual balls 11, guided in one of the longitudinal hole guides 10, are moved radially back and forth upon the rotation of the drive disk 2. (FIGS. 3 to 5) The radial back and forth motion of balls 11, due to the cooperation between eccentric groove 9 and the radial longitudinal holes, impart a tangential force to the groove wall 14, whereby the driven disk 3 is rotated in a direction opposite to the rotation of the drive disk 2. In the process, the elongated hole guides 10 coincide not only with the eccentric groove 9, but also with the groove 14 on the driven side, which includes by virtue of its undulation an oblique angle with the eccentric groove 9 of the drive disk 2 in all points of coincidence and also with all of the elongated hole guides 10 when viewed statically. All of the balls 11 are positively engaged or guided (enclosed) in an intersection between the grooves 9 and 14 and the elongated hole guide 10. The forces are therefore transmitted over a large load-bearing cross section. The gears may be built significantly smaller than conventional toothed gears, in which forces are transmitted only over a few engaging teeth assuming transmission of equal torque. Correspondingly, the gears according to the invention enable transmission of substantially larger and theoretically unlimited torques when compared to conventional gears with comparable installed sizes. If one force transmission line (eccentric groove-slot guided ball set-undulating path) is not sufficient to transmit the forces required, it is merely necessary to provide another force transmission line or several transmission lines with an identical division or pitch in the same or enlarged drive and driven parts.

The gear is simple in its manufacture. Production steps involve only machining of the ball guide grooves and elongated hole guides and use of commercially available inexpensive balls. This is contrast to the teeth of toothed gears which require special processing. Any wear enlargement of the ball guide grooves which may be unavoidable under extended operating conditions may be equalized without difficulty, by replacing the balls with balls of a correspondingly larger diameter. The gears therefore have a significantly longer operating life compared to conventional gears.

The transmission ratio of the gears is freely selectable in the form of an integer ratio. Its relationship to the number of balls 11 used in a transmission line on the one hand, and the undulations in the undulating groove on the other, are determined by the equation:

$$U = (W - K)/W$$

wherein W is the number of undulations in the guide groove 14 on the driven side and K the number of the force transmitting balls and radial guide slots, which according to present knowledge amounts to at least between 1 and (W+1). Therefore, from the constant force-transmitting engagement of all of the balls installed results that even if only a single ball is used (however, at least two balls are employed to avoid the dead center setting of the gear) operation of the full function is obtained, wherein the driven parts of gears which in keeping with the above-cited equation lead to negative values (K larger than W), rotate in a direction opposite to that of the drive gear, while in the case of positive values (K smaller than W), the drive and the driven gears rotate in the same direction.

The gear is calculated on this basis (for reduction gears) by initially calculating the drive division/pitch (i.e., the length of one undulation in the undulating groove 14 of the driven part 3) by multiplication of the length of the base circle, i.e. the length of the circle circumscribing the undulating groove 14 of the driven parts 3, by the transmission ratio desired. This directly yields the number of balls 11 to be used and thus the division of the slots 10 in the flange 6 with (W+1). In contrast, for transmission gears (K smaller than W) every transmission ratio may be determined directly as an integer numerical relationship, wherein the possibility of the manufacture of gears with fractional (non-integer) transmission ratios, may also be expected.

On this basis, the flank slope of the undulating groove 14 may be freely chosen in keeping with the gear transmission requirements. The slots 10 length and driven part groove 9 eccentricity may be determined directly and other parameters, in particular the undulating groove 14 curve may be indirectly determined by simple mathematical relationships. Additional parameters, such as restrictions hindering free layout of the known toothed gears to a predetermined or coordinated transverse pitch between the drive and driven parts need not be considered so that gears with reduction ratios of less then 9:1 to a reduction of 2:1 may be produced without problems. These reduction ratios cannot by attained by known reduction gears. This results in a further advantage, compared to other gears that drive aggregates with lower shaft speeds may be used in order to obtain similar drive shaft speeds when using the gear according to the invention.

FIG. 5 shows examples of appropriate undulations. FIG. 5a displays a straight line zig-zag configuration 14a, and an acutely breaking wave form 14b. FIG. 5b shows the preferred guide grooves with regular wave shapes 14c and 14d with different undulations. FIG. 5c shows a further reduction of the undulation path to a polygonoid shape composed of three circular segments 15a, 15b, 15c centered on the center axis. The undulation of the guide may be further reduced to an elliptical shape 50 as shown in FIG. 5d.

Figure 6:
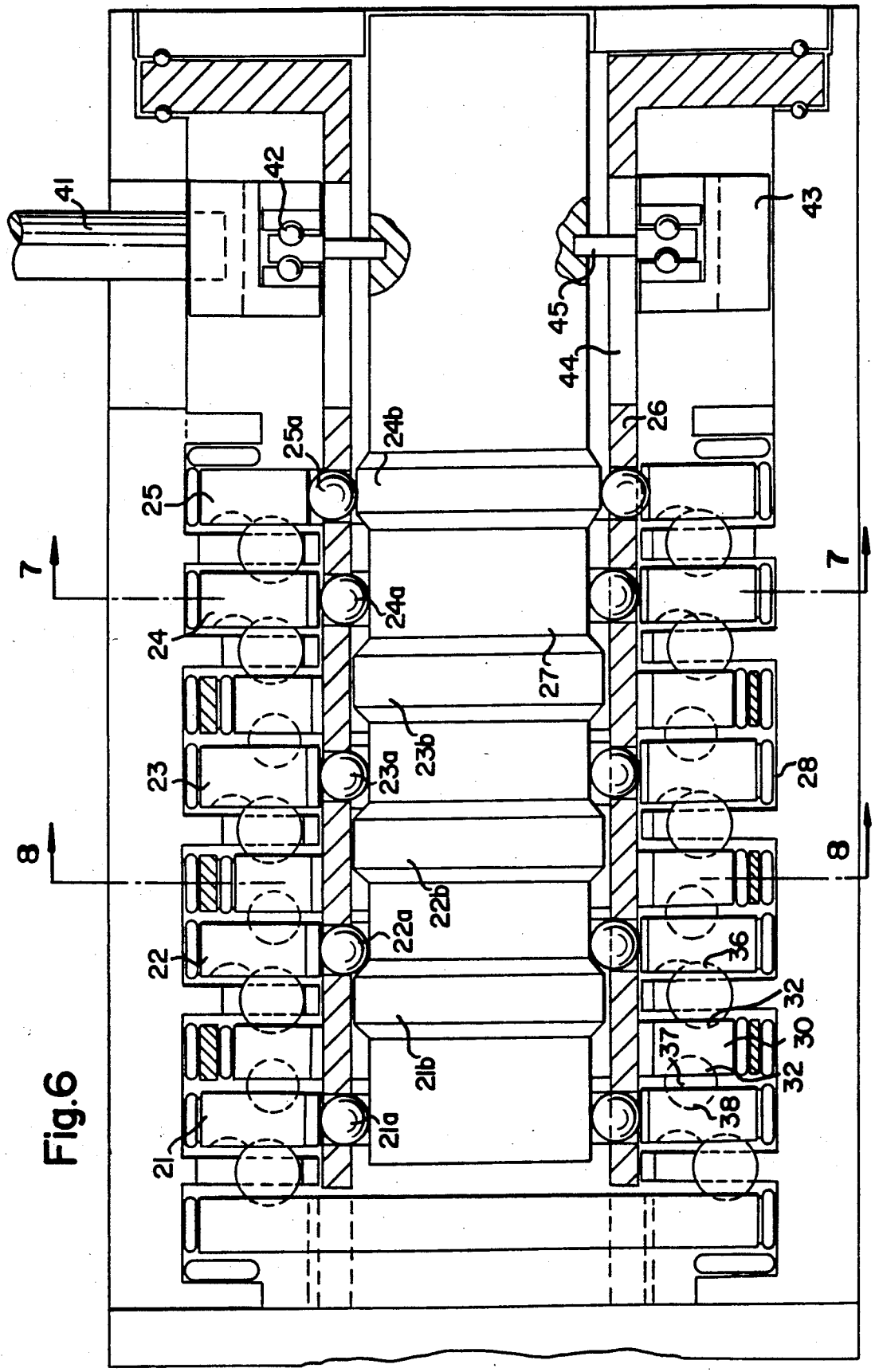
FIG. 6 shows a further embodiment of a switch gear in section.
Figure 7:
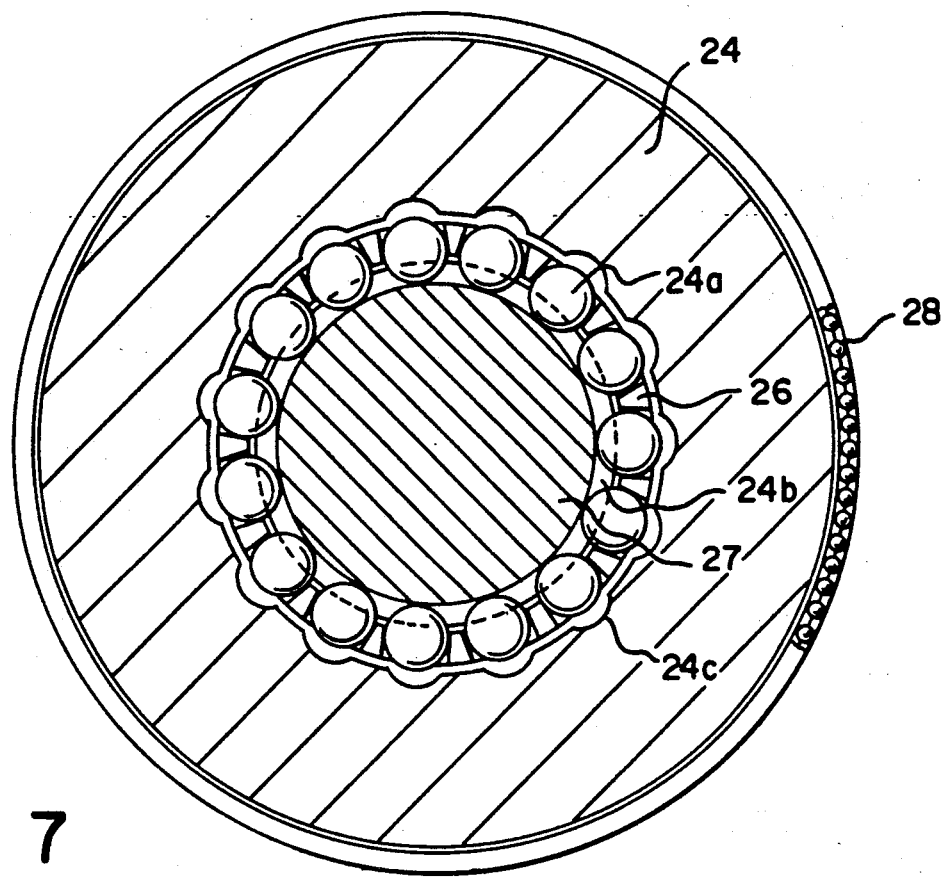
FIG. 7 shows a section on VII—VII through FIG. 6.
Figure 8:
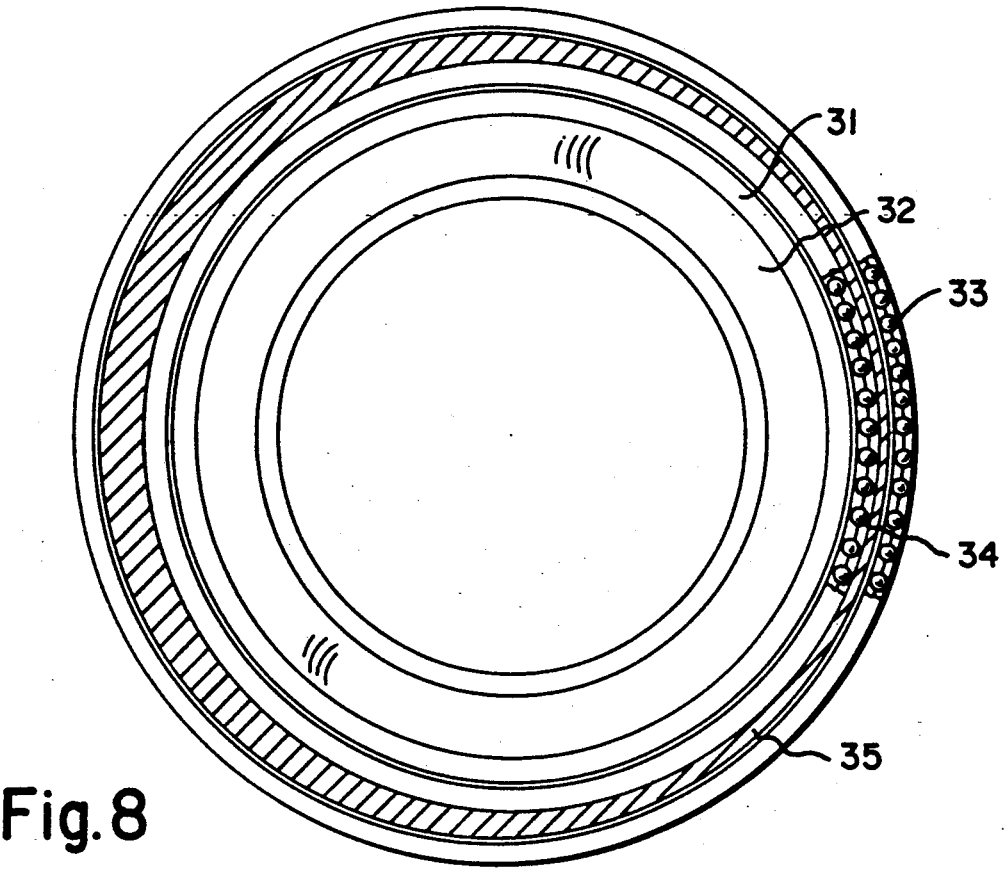
FIG. 8 shows a section through FIG. 6 on VIII—VIII.

Multiple stage gears may be laid out according to the invention to yield multispeed gears. FIG. 6 to 8 shows a multistage switch gear. The driven part includes a number of driven disks 21, 22, 23, 24, 25, corresponding to the number of gear speeds joined together fixedly in rotation by balls 11. The driven disks exhibit an undulating groove with a number of waves adjusted to the reduction ratio desired relative to the driven disk preceding it in the drive assembly. A hollow shaft 26 extends through the internal bores of the driven disks and the flanges 6, which defines a ball cage to receive in each case a set of balls 21a, 22a, 23a, 24a, 25a radially extrudable into an associated driven part in the planes of the driven disks (FIG. 7). A switching element or cam slide 27 displaying cam beads 21b, 22b, 23b, 24b circumferentially spaced in a stepped manner runs through the hollow shaft 26. Axial displacement of the cam slide 27 effects joining of one of the driven disks rotatingly with the hollow shaft 26, in this example the bead 24b, with the reversing driven disk 25—with the hollow shaft 26. In the position illustrated in FIG. 6 the bead 24b enables a reversing gear disk 25 so that the balls of the set of balls 25a involved move into the ball caps 24c of the associated driven disk 24, while releasing the balls of all other ball sets 21a, 22a, 23a, 24a, and are held in this position. The driven disks are supported by a supporting bearing 28 in the casing 1 in the embodiment of FIG. 6. Bearings 28 are only required if large forces are to be transmitted and may be eliminated when transmission of only small forces is anticipated.

A gear laid out in this manner is simply configured and enables shifting by simple linear displacement of a cam slide, either manually or by programmed control. It is particularly appropriate for use where spacial conditions only permit installation of an elongated gear with a small diameter. As in the successive switching of driven disks a reversal in direction occurs from stage to stage. The gear transmission may be arranged as a multiple speed gear with an arbitrary number of gear speeds transmitting force in opposing directions. It is sufficient to join together an arbitrary number of driven disks with intermediate insertion of a flange attached to the casing in each case provided with radial guide slots for the force transmitting balls. The driven disks may exhibit an eccentric groove on the side facing the drive side and an undulating groove on the side facing the driven part.

In an advantageous variant of the switch gear each of the successive driven disk 21, 22, 23, 24 with different transmission ratios may be preceded by a reversing disk 30 (see also FIG. 8) to obtain the same direction of rotation. The reversing disk may be an annular disk 31 with a concentric guide groove 32 on both of its surfaces. The disk 31 supported on one side by an eccentric bearing made up of an eccentric disk 35 guided between the ball rings 33, 34, in the casing 2, and indirectly on the other side by engaging the balls 11 through the flange 6 following it and to a subsequent driven disk 22 with a concentric undulating ball guide groove 36 on the drive side face. The reversing disk is directly connected to the preceding driven disk 21 by a set of balls 37 seated in a concentric ball guide groove 38 on the driven side face in a force transmitting manner. The reversing disk does not permit direct use of the force for driving purposes. The reversing disk effects a reversal of the direction of rotation in a ratio of 1:1.

The cam slide 27 may be a shift rotatingly located in the hollow shaft 26 and connected to a switching slide 41 by a rotating bearing 42, fastened to a sliding link 43 axially guided on the hollow shaft 26. The hollow shaft 26 may be provided with radially overlapping elongated hole guides 44 and the sliding link 43 may be provided with a guide pin 45 projecting through the elongated hole guide 44.

In the position shown in FIG. 6, the hollow shaft 26 is engaged due to the joining of the driven disk 25 by means of the balls 25a and the cam bead 24b. The first speed is shifted from this position by the axial displacement of the actuating handle 41 and thus of the cam slide 27 to the left, whereby the cam bead 24b is moved out of the area of the ball ring 25a initially by the release of the reverse speed and subsequently into the range of the set of balls 24a, which thereby are moved into the ball pan 24c. In this manner a fixed rotating connection is established between the driven disk 24 and the hollow shaft 26, which is therefore driven at the speed determined by the driven disks 24. The cam slide 27 rotates in the same manner in view of its connection with the guide pin 45, without causing a reaction against the switching slide 41 by the connection through the rotating bearing 42.

The other speeds are switched simply by the continued axial displacement of the switching slide 41, whereby with the simultaneous release of the ball force joint 24a, 24b the subsequent ball force joint 23a, 23b is engaged in the same manner, whereupon the shaft 26 is driven with the reduction given by the driven disk 23. The driven disk 25 differs from the driven disks 21 to 24 by its lack of an associated reversing disk it being the reverse gear.

Figure 9:
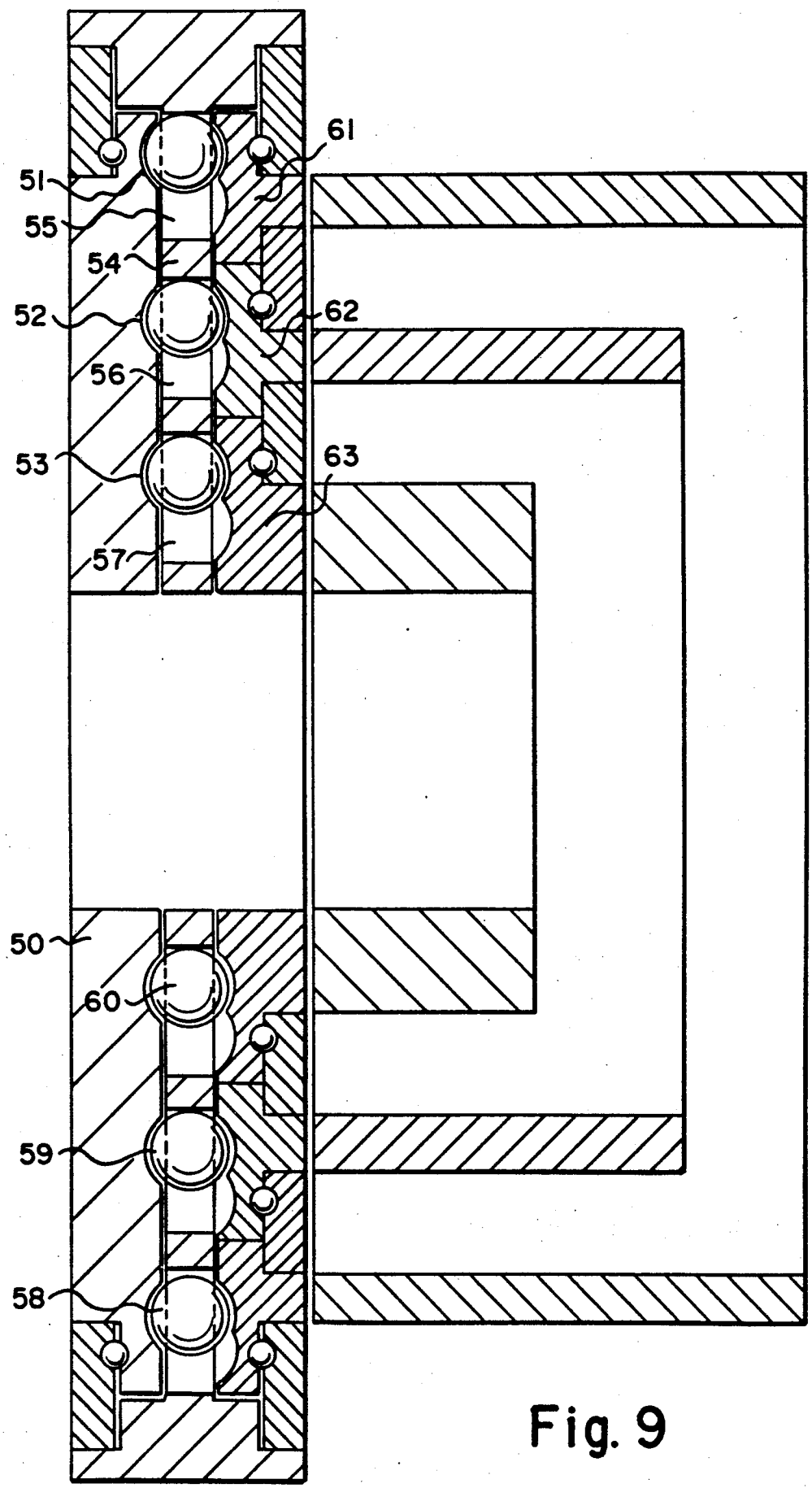
FIG. 9 shows a further embodiment of a switch gear on section.

FIG. 9 shows a further embodiment according to the invention which may be used in applications which permit a larger installed width but only a limited length. Drive disk 50 is provided with several eccentric ball guide grooves 51, 52, 53 extending into each other. The flange 54 exhibits a corresponding number of radial slots 55, 56, 57 cooperating with the ball guide grooves 51, 52, 53 for the guidance of a set of balls 58, 59, 60 each of which is engaging one of the other independently rotating driven disks 61, 62, 63. The individual driven disks have different reduction ratios relative to the common drive and may be coupled with a driven aggregate, for example in a fashion corresponding to the driven part according to FIG. 6, by a magnetic clutch or the like. This embodiment represents a gear with a capacity that is difficult to overestimate relative to space requirements, transmission range and the transmission of force.

Alternatively, the drive disk 50 may be divided in a manner similar to the driven parts 61, 62, 63. The resulting annular drive disks may be connected to an engine, for example, by an electromagnetically controlled cam slide. This embodiment is suitable for the manufacture of automatic drives and advantageously on both the drive and the driven side always only one of the annular disks is revolving and there is no need for a clutch. The conventional flywheel may be used simultaneously as the drive disk of the gear.

Figure 10:
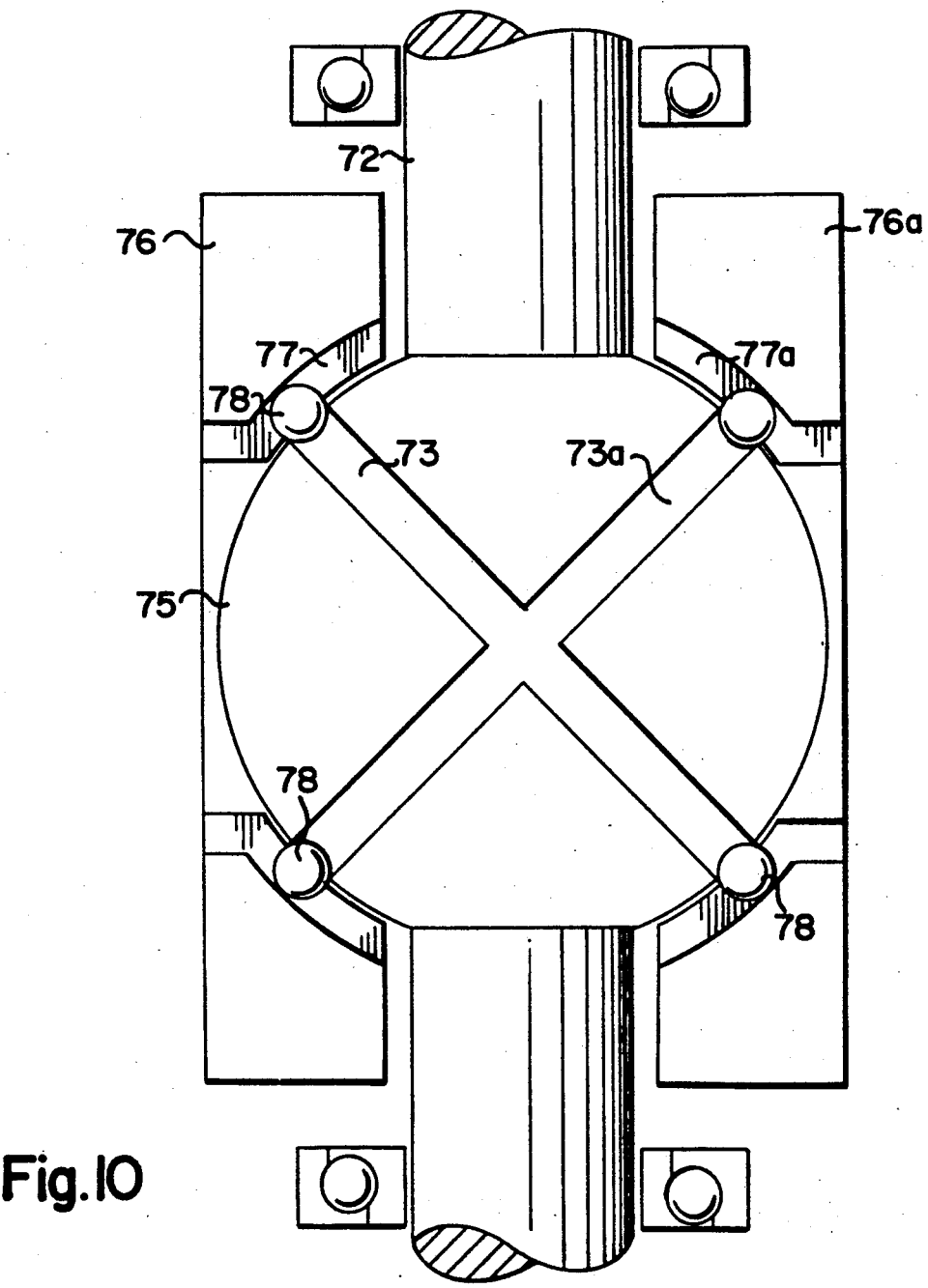
FIG. 10 shows a schematic view of an angular drive in section.

FIG. 10 illustrates an embodiment according to the invention configured as an angular gear. The driven part is a ball head 75 provided with at least one rotatingly supported driven journal 72 and at least one endless ball guide groove 73. The drive disk may be an annular disk 76 with an internal opening corresponding to the contour of the spherical surface. The drive disk opening is equipped with ball pans 77 to receive at least one ball 78 guided in the ball guide groove 73. In the illustrated embodiment two ball guide grooves 73, 73a extend concentrically around the center of the ball head 75, wherein the two drive parts 76, 76a are synchronously joined together. A corresponding number of balls 78 are guided. To produce a gear with a drive angle other than a right angle, a ball guide groove extending eccentrically on the surface of the ball head may also be provided.

The guide groove 9 may be machined directly into the drive disk 2 as illustrated in FIGS. 1 to 9. In slow running drives this yields excellent results. In an embodiment applicable particularly to high speed drive machines (FIG. 11) the guide groove for the balls 11 may be arranged advantageously in an equalizing ring 16, which is supported on a ball cage 17 in the drive disk 2, supporting the equalizing ring 16 in the axial direction. The radial movement responsible for the force transmission of the balls is at a frequency corresponding to the speed of the drive part. The rotation of the equalizing ring 16 and thus of the groove 9 itself is already reduced on the drive side to the speed of the driven part. The rotation of the balls of the ball cage 17 is further reduced by the driven speed due to the reaction of the rotation from the driven disk over the balls 11 onto the equalizing ring 16. The friction and impact forces caused by the high speed rotation of the drive disk and thus the wear and tear, are thereby decisively reduced and the efficiency of the gear is further increased. An essentially identical result is obtained if an eccentric groove is provided in the drive disk and the guide groove 9 for the balls 11 arranged in an equalizing ring (concentrically on both sides) supported in the eccentric groove of the drive disk 2 by a radially supporting ball cage.

Figure 11:
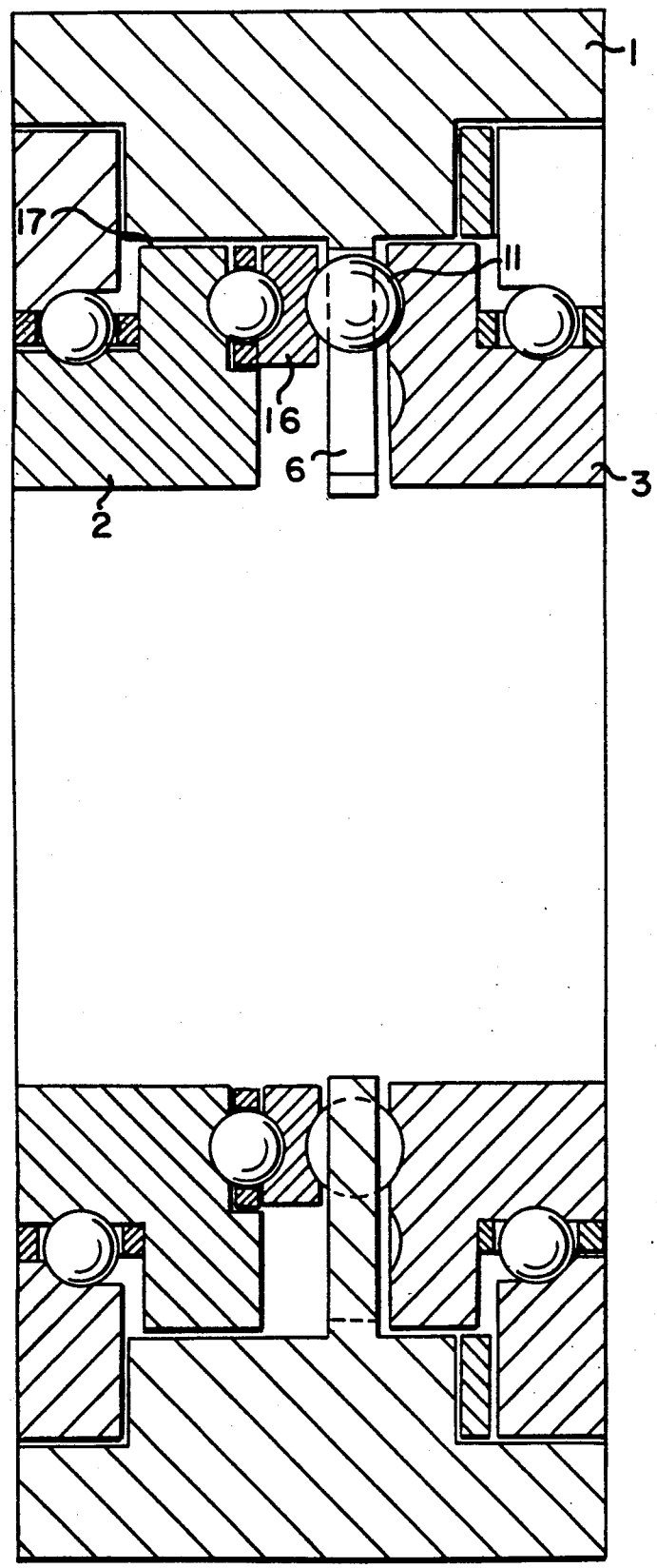
FIG. 11 show a gear with a different drive disk configuration.
Figure 12:
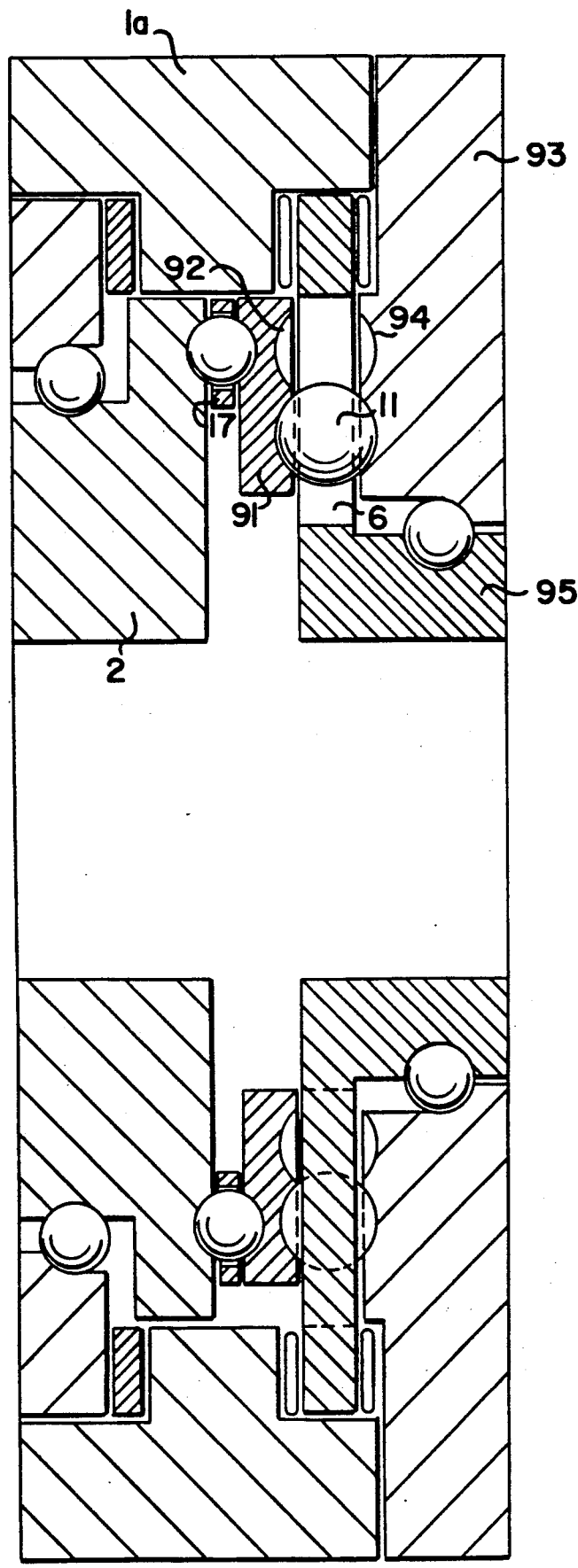
FIG. 12 shows a further development of the drive shown in FIG. 11 with simultaneous kinematic reversal of the functional parts.

A significant reduction of wear and improvement in quiet running is obtained by a further development illustrated in FIG. 12. The ball bearing supported equalizing ring 91 on the drive part 2 may have an undulating groove 92 in place of a circular guide groove for guidance of the balls 11 effecting the transmission of force. The undulations have a height (amplitude of the undulating path 94) corresponding to the opposite functional part and a number of undulations (division) different from it. Here, in a kinematic reversal of the embodiment of FIG. 11 the functional part containing the undulating groove 94 has a flange fixed to the casing, while the annular flange 6 containing the longitudinal hole guides 10 is located on the driven part 95 and projects between the equalizing ring 91 and the flange 93. This embodiment enables a radial configuration of the driven part while giving up the large center passage. In an analogous variation, the embodiment of the equalizing ring shown in FIG. 11 may have a configuration similar to the ring 91 of FIG. 12, i.e. it may be provided with an undulating groove for the guidance of the force transmitting balls 11 in place of a circular groove.

Figure 13A:
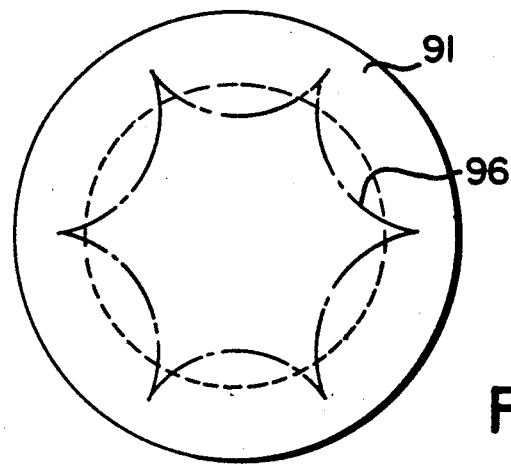
FIGS. 13 a, b show examples of the configuration of the undulating grooves of the embodiment of a gear in FIG. 11 and 12.
Figure 13B:
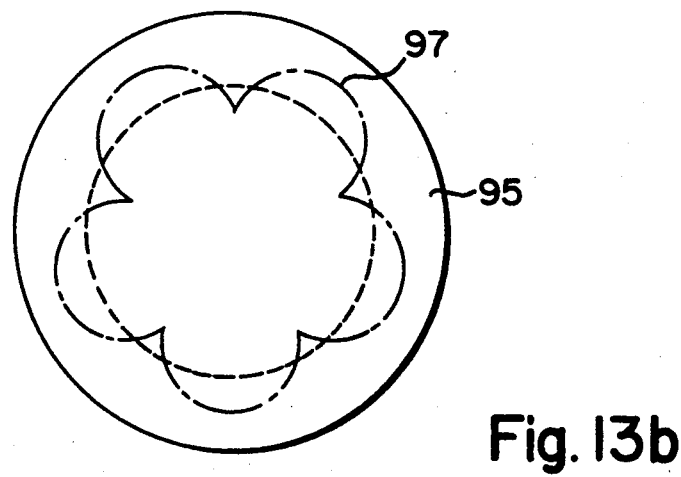
Figure 5D:
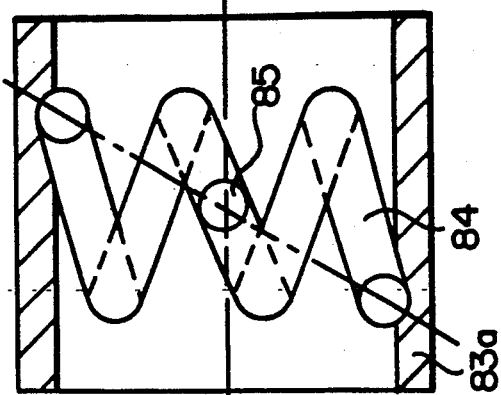
Figure 16:
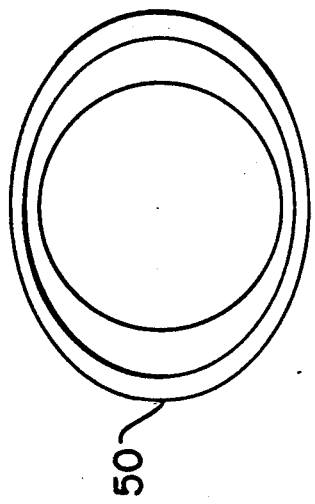
FIG. 16 shows an exploded view corresponding to FIG. 15 of a gear with a kinematically reversed parts layout.
Figure 16:
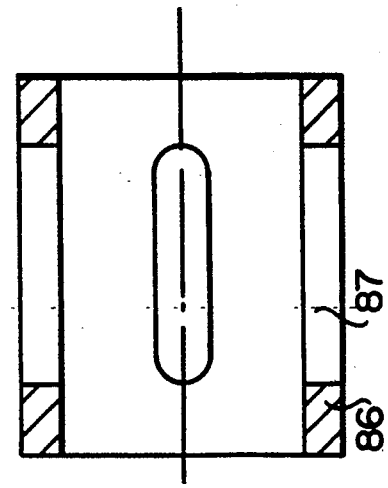
Figure 16:
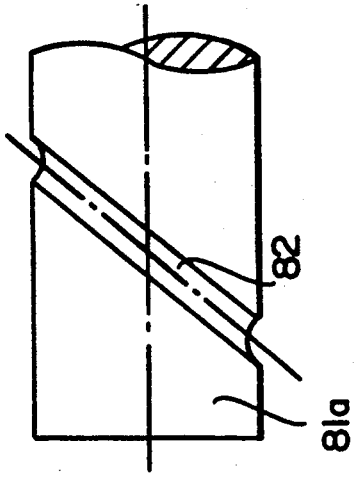

FIG. 13 shows two undulating grooves, which may be set in combination with each other into the gears according to FIG. 11 and 12. In the example shown, the undulations of both the undulating groove 96 of the equalizing ring 91 and the undulating groove 97 of the flange 95 may have an acutely converging form. The groove 96 is concave and the groove 97 convex. However, both grooves may be concave corresponding to the groove 96.

Figure 17:
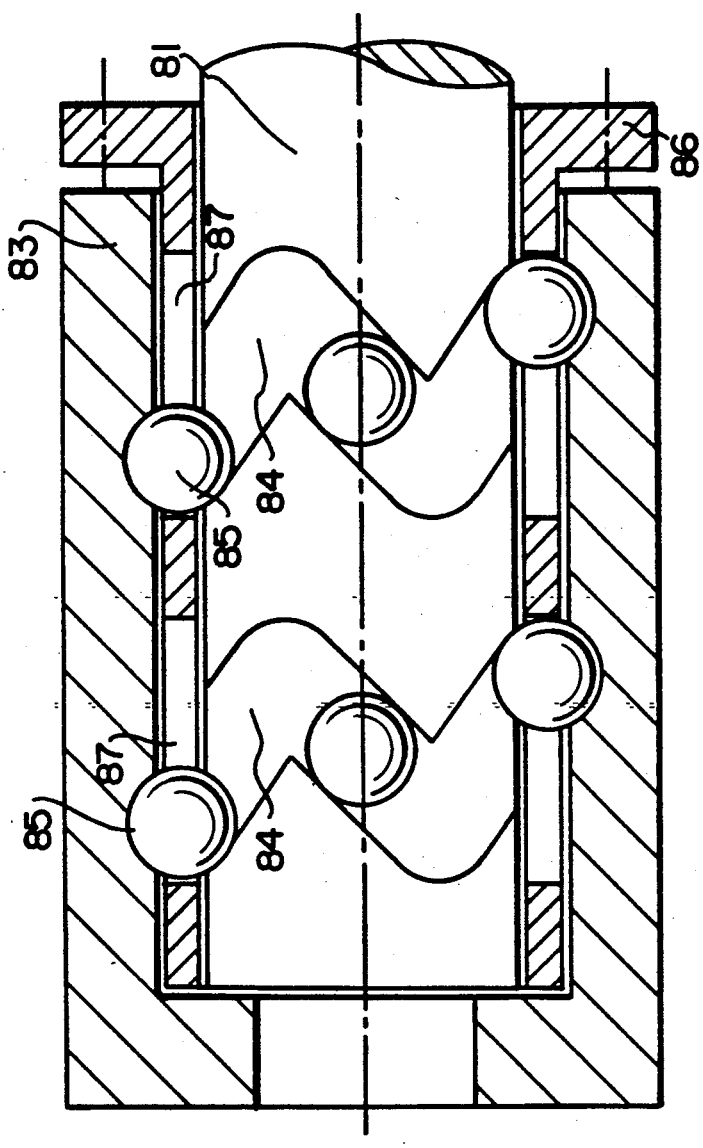
FIG. 17 shows a modification of the gear shown in FIG. 12.
Figure 14:
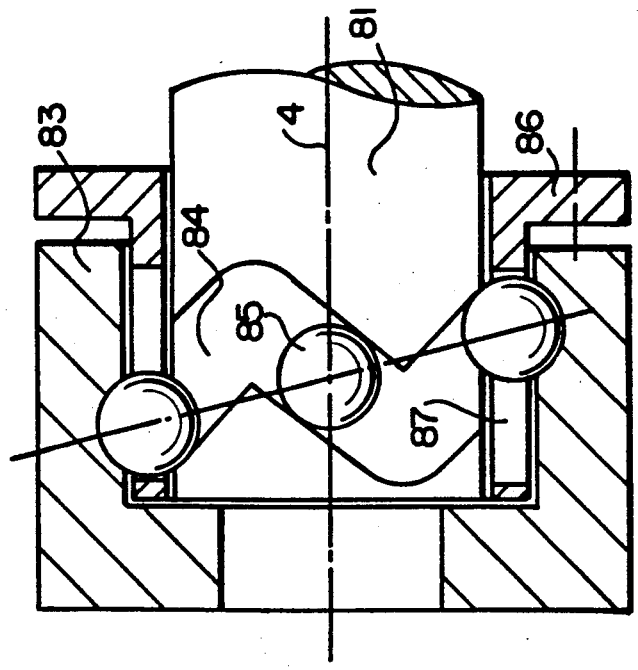
FIG. 14 shows another embodiment of an axial gear with direct drive.

In the embodiment shown in FIGS. 14 and 17 of a gear with aligned drive and driven axles the driven part may be a shaft 81 and the drive part of a sleeve 83 surrounding the shaft 81. The sleeve 83 is provided with an endless guide groove 82 on its surface facing the shaft 81. The shaft 81 may have an endless guide groove 84 of curve segments for guidance of force transmitting balls 85. A sleeve 86 is provided between the sleeve 83 and the shaft 81 fixed to the casing and equipped with an arbitrary number of axially parallel elongated hole guides 87 covering the axial stroke height of the ball guide groove 82 of the sleeve 81. The balls 85 are secured against rotation around the rotating axis of the gear. This represents a particularly simple and space saving embodiment of a gear according to the invention with direct drive by an engine shaft. The sleeve 83 may be flanged directly to the engine shaft creating a solid joint of the flange sleeve 86 for example with the engine casing, so that the driven shaft 81 coming from the engine casing has a reduced speed to the engine shaft.

Figure 15:
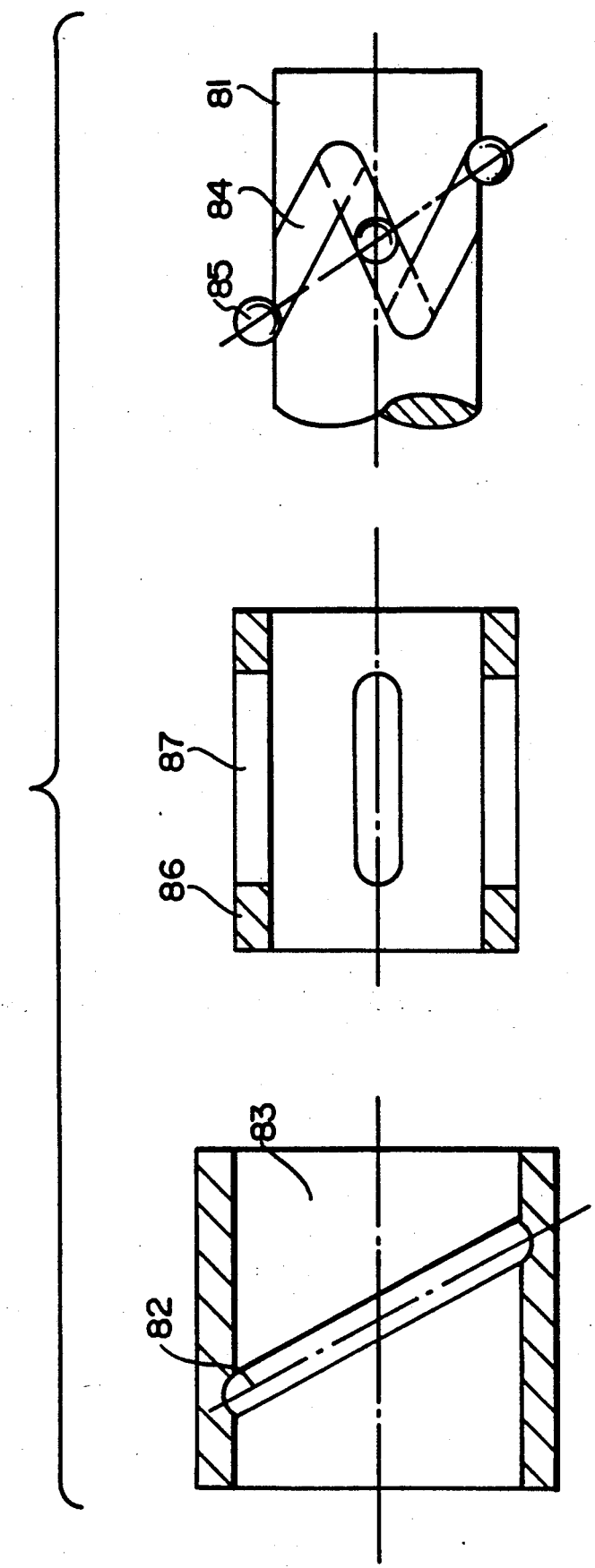
FIG. 15 shows an exploded view of the gear according to FIG. 14 with partially sectioned functional parts.

In the kinematic reversal of the gear shown in FIGS. 14 and 15 in an exploded view, the undulated part 81 forms the drive part containing the oblique guide groove 82 and the sleeve 83a forms the driven part containing the groove 84.

FIG. 17 shows a modification of the embodiment according to FIG. 14. Two force transmission lines with two oblique grooves 82, two undulating grooves 84, two sets of balls 85, and two rows of slots 87 with identical divisions are provided to double the force transmitting ball cross section. In a corresponding manner, the number of force transmission lines may be increased in an arbitrary manner.

The mode of operation of this embodiment corresponds to the mode of operation of the embodiment according to FIGS. 1 to 5, whereby the direct use of the shaft as the drive part for certain applications an even more compact configuration may be obtained. Furthermore, in a corresponding manner the embodiments described relative to FIGS. 11 to 17 may also be switch gears by analogous application of the characteristics described for FIGS. 6 to 9.

I claim:
1. A transmission gear comprising:
   a drive part positioned to rotate about a center axis, said drive part displaying an endless guide groove;
   a driven part positioned to rotate around said center axis, said driven part displaying an endless guide groove wherein said drive guide groove and said driven guide groove are configured at an angle to each other;
   at least one force transmission ball placed between said drive part and said driven part at an intersection of said drive guide groove and said driven guide groove;
   means for limiting motion of said force transmission ball so that said ball effects a transfer of rotational force and change in angle of rotation from said drive part to said driven part;
   wherein said drive part is a drive disk and said drive guide groove is an eccentric circular groove relative to said axis;
   said driven part is a driven disk and said driven guide groove exhibits a plurality of curve segments centered around said axis;
   wherein said means for limiting motion comprises at least;
   a fixed flange arranged between said drive disk and said driven disk;
   said flange exhibiting elongated hole guides covering a radial deflection of each of said drive disk and driven disk guide grooves, and containing a respective force transmission ball, wherein said flange secures said balls against rotation around said axis; an equalizing ring axially bearingly supported in said drive disk and carrying said drive guide groove.

2. A gear according to claim 1 wherein said driven guide groove is an undulating groove exhibiting a deflection range corresponding to a length of said radial, elongated, hole guides, and a number of undulations differing from the number of the ball guiding elongated hole guides.

3. A gear according to claim 1 wherein said driven guide groove is a polygonal groove displaying circular segments centered on said axis.

4. A gear according to claim 1, wherein said drive groove located in said equalizing ring is an undulating groove, with an undulation range corresponding to the driven groove range and with a different undulation period.

5. A gear according to claim 4, wherein said equalizing ring displays an undulating groove cooperating with said undulating driven groove supported in a second flange fixed to a casing and supporting said driven part;
   wherein said means for limiting project between said equalizing ring and said second flange.

6. A gear according to claim 5 wherein undulating grooves of said equalizing ring and of the second flange exhibit a configuration passing acutely into each other, wherein one of said undulating grooves is concave and another is convex.

7. A transmission gear comprising;
   a drive part positioned to rotate about a center axis, said drive part displaying an endless guide groove;
   a driven part positioned to rotate around said center axis, said driven part displaying an endless guide groove wherein said drive guide groove and said driven guide groove are configured at an angle to each other;
   at least one force transmission ball placed between said drive part and said driven part at an intersection of said drive guide groove and said driven guide groove;
   means for limiting motion of said force transmission ball so that said ball effects a transfer of rotational force and change in angle of rotation from said drive part to said driven part;
   wherein said drive part is a drive disk and said drive guide groove is an eccentric circular groove relative to said axis;
   said driven part is a driven disk and said driven guide groove exhibits a plurality of curve segments centered around said axis;
   wherein said means for limiting motion comprises at least;
   a fixed flange arranged between said drive disk and said driven disk;
   said flange exhibiting elongated hole guides covering a radial deflection of each of said drive and driven disk guide grooves, and containing a respective force transmission ball, wherein said flange secures said balls against rotation around said axis;

wherein said driving part has a plurality of guide grooves and said driven part has a plurality of guide grooves, each corresponding to a respective guide groove of said driving part and said fixed flange exhibits a plurality of sets of guide grooves and force transmission balls each associated with a respective driving part and driven part guide groove.

8. A gear for shifting transmission ratios comprising:
a drive part positioned to rotate about a center axis, said drive part displaying an endless guide groove;
a driven part positioned to rotate around said center axis, said driven part displaying an endless guide groove wherein said drive guide groove and said driven guide groove are configured at an angle to each other;
at least one force transmission ball placed between said drive part and said driven part at an intersection of said drive guide groove and said driven guide groove;
means for limiting motion of said force transmission ball so that said ball effects a transfer of rotational force and change in angle of rotation from said drive part to said driven part;
wherein said drive part is a drive disk and said drive guide groove is an eccentric circular groove relative to said axis;
said driven part is a driven disk and said driven guide groove exhibits a plurality of curve segments centered around said axis;
wherein said means for limiting motion comprises at least;
a fixed flange arranged between said driven disk and said driven disk;
said flange exhibiting elongated hole guides covering a radial deflection of each of said drive disk and driven disk guide grooves, and containing a respective force transmission ball,
wherein said flange secures said balls against rotation around said axis;
a plurality of driven disks corresponding to the number of speeds, joined in rotation by intermediate balls each driven guide groove exhibiting a different numbers of undulations;
a hollow shaft axially projecting through said driven disks, said hollow shaft exhibiting recesses in planes of the driven disks to hold a set each of balls adapted for insertion into receptacle areas of an associated driven part;
a slide cam shifting element displaying spaced circumferential cam beads, axial displacement of said shifting elements engages one of said driven disks with said hollow shaft by radial displacement of a circumferential set of locking balls through said recesses in said hollow shaft by simultaneous engagement into ball pans of a corresponding driven disk.

9. A gear according to claim 8, further comprising a reversing disk inserted successively in front of said driven disks.

10. A gear according to claim 9 further comprising a plurality of intermediate flanges between said driven disks, stationarily mounted and exhibiting radial guide slots for force transmitting balls, and wherein each driven disk exhibits an eccentric groove on its face on a drive side and an undulating groove on its driven side.

11. A gear according to claim 9 wherein said reversing disk is an annular disk exhibiting concentric ball guide groove on each of its faces, supported by an eccentric bearing formed by an eccentric disk running between ball raceways in a housing and engages said force transmission balls through said flange following it;
a successive driven disk exhibits an undulating concentric ball guide groove on a driving side face, said driven disk further exhibits an concentric ball guide groove on a driven side face; and
a ball set between said reversing gear drive side concentric guide groove and previous driven gears driven side concentric guide groove.

12. A gear according to claim 8 wherein said cam slide is a shaft rotatingly supported in said hollow shaft and connected to a switching slide by a rotating bearing mounted on a slide link, axially guided in said hollow shaft.

13. A gear according to claim 12, wherein said hollow shaft displays radially overlapping elongated hole guides and said slide link is equipped with a guide pin projecting through said elongated hole guide.

14. A gear for shifting transmission ratios comprising:
a drive part positioned to rotate about a center axis, said drive part displaying an endless guide groove;
a driven part positioned to rotate around said center axis, said driven part displaying an endless guide groove wherein said drive guide groove and said driven guide groove are configured at an angle to each other;
at least one force transmission ball placed between said drive part and said driven part at an intersection of said drive guide groove and said driven guide groove;
means for limiting motion of said force transmission ball so that said ball effects a transfer of rotational force and change in angle of rotation from said drive part to said driven part;
wherein said drive part is a drive disk and said drive guide groove is an eccentric circular groove relative to said axis;
said driven part is a driven disk and said driven guide groove exhibits a plurality of curve segments centered around said axis;
wherein said means for limiting motion comprises at least;
a fixed flange arranged between said drive disk and said driven disk;
said flange exhibiting elongated hole guides covering a radial deflection of each of said drive disk and driven disk guide grooves, and containing a respective force transmission ball, wherein said flange secures said balls against rotation around said axis;
wherein said drive part displays a plurality of eccentric ball guide grooves;
said flange exhibits a corresponding number of radial slots interacting with said ball guide grooves for the guidance of a set of balls each, with each of said ball sets engaging a respective driven disk rotating independently of each other.

15. A transmission gear comprising:
a drive part positioned to rotate about a center axis, said drive part displaying an endless guide groove;
a driven part positioned to rotate around said center axis, said driven part displaying an endless guide groove wherein said drive guide groove and said driven guide groove are configured at an angle to each other;

at least one force transmission ball placed between said drive part and said driven part at an intersection of said drive guide groove and said driven guide groove;

means for limiting motion of said force transmission ball so that said ball effects a transfer of rotational force and change in angle of rotation from said drive part to said driven part;

wherein said driven part is a one ball head rotatingly supported on at least one driven journal around a second axis and exhibiting at least one endless ball guide groove;

said drive part is an annular disk with an internal opening corresponding to a contour of said ball head, said drive part displays at least one ball seat to receive corresponding force transmission balls guided in said ball guide groove of said ball head wherein said guide groove intersects said ball seat.

16. A gear according to claim 15, wherein said ball guide groove extends concentrically around the center of said ball head.

17. A gear according to claim 15 further comprising a plurality of ball guide grooves intersecting at two common points and extending concentrically around the center of said ball head and a corresponding number of force transmission balls seated in said drive part.

18. A gear according to claim 17 further comprising a second drive part fixedly joined in rotation to said first drive part; and at least a second ball engaging one of said guide grooves in a force transmitting manner, seated in said second drive part.

19. A gear according to claim 15 wherein said endless ball guide groove extends eccentrically in the surface of the ball head.

20. A gear comprising:

a drive part positioned to rotate about a center axis, said drive part displaying an endless guide groove;

a driven part positioned to rotate around said center axis, said driven part displaying an endless guide groove wherein said drive guide groove and said driven guide groove are configured at an angle to each other;

at least one force transmission ball placed between said drive part and said driven part at an intersection of said drive guide groove and said driven guide groove;

means for limiting motion of said force transmission ball so that said ball effects a transfer of rotational force and change in angle of rotation from said drive part to said driven part;

wherein said drive part is a drive disk and said drive guide groove is an eccentric circular groove relative to said axis;

said driven part is a driven disk;

wherein said means for limiting motion comprises at least;

a fixed flange arranged between said drive disk and said driven disk;

said flange exhibiting elongated hole guides covering a radial deflection of each of said drive disk and driven disk guide grooves, and containing a respective force transmission ball, wherein said flange secures said balls against rotation around said axis;

wherein said driven guide groove is an elliptical groove centered on said axis.

* * * * *